United States Patent [19]

Dunckel

[11] 3,935,063

[45] Jan. 27, 1976

[54] EMERGENCY HEAT REMOVAL SYSTEM FOR A NUCLEAR REACTOR

[75] Inventor: Thomas L. Dunckel, Potomac, Md.

[73] Assignee: The United States of America as represented by the United States Energy Research and Development Administration, Washington, D.C.

[22] Filed: Nov. 28, 1973

[21] Appl. No.: 419,832

[52] U.S. Cl. ............... 176/38; 165/105; 176/37; 176/39
[51] Int. Cl.² ............... G21C 9/00; F28D 15/00
[58] Field of Search ......... 176/37, 38, 39; 165/105, 165/106

[56] References Cited
UNITED STATES PATENTS

| | | | |
|---|---|---|---|
| 3,093,562 | 6/1963 | Zinn | 204/193.2 |
| 3,378,449 | 4/1968 | Roberts | 176/33 |
| 3,378,454 | 4/1968 | Fiebelmann | 176/72 |
| 3,459,925 | 8/1969 | Goosey | 235/151 |
| 3,668,070 | 6/1972 | Fiebelmann | 176/40 |
| 3,709,781 | 1/1973 | Fiebelmann | 176/39 |
| 3,854,454 | 12/1974 | Lazaridis | 122/33 |
| 3,854,524 | 12/1974 | Gregorie | 165/32 |

FOREIGN PATENTS OR APPLICATIONS

| | | | |
|---|---|---|---|
| 2,009,269 | 1/1970 | France | 176/39 |
| 1,220,553 | 1/1971 | United Kingdom | 176/39 |

Primary Examiner—Harvey E. Behrend
Assistant Examiner—Ralph Palo
Attorney, Agent, or Firm—John A. Horan; Kenneth L. Cage

[57] ABSTRACT

A heat removal system for nuclear reactors serving as a supplement to an Emergency Core Cooling System (ECCS) during a Loss of Coolant Accident (LOCA) comprises a plurality of heat pipes having one end in heat transfer relationship with either the reactor pressure vessel, the core support grid structure or other in-core components and the opposite end located in heat transfer relationship with a heat exchanger having heat transfer fluid therein. The heat exchanger is located external to the pressure vessel whereby excessive core heat is transferred from the above reactor components and dissipated within the heat exchanger fluid.

5 Claims, 7 Drawing Figures

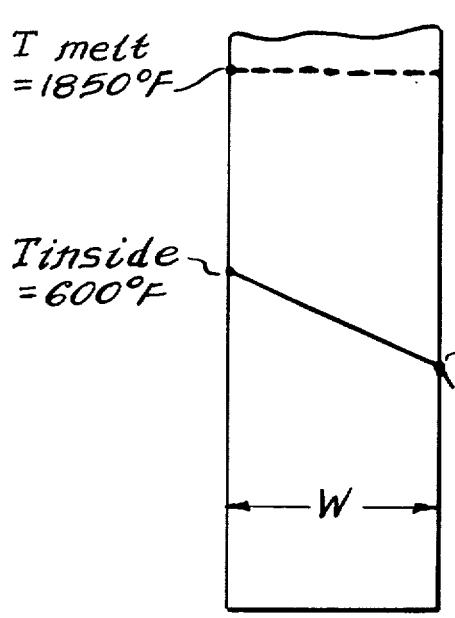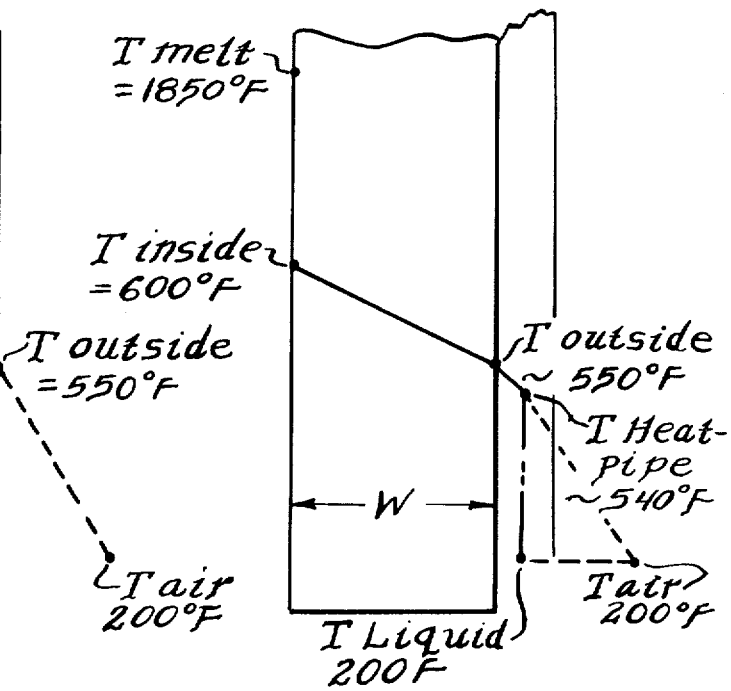
Fig-4a    Fig-4b
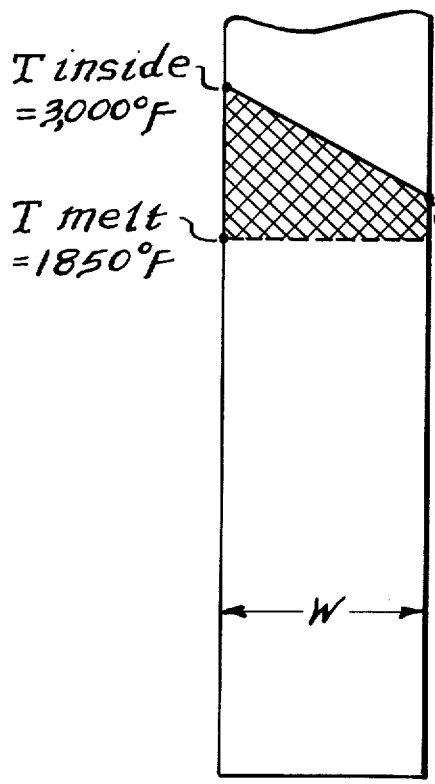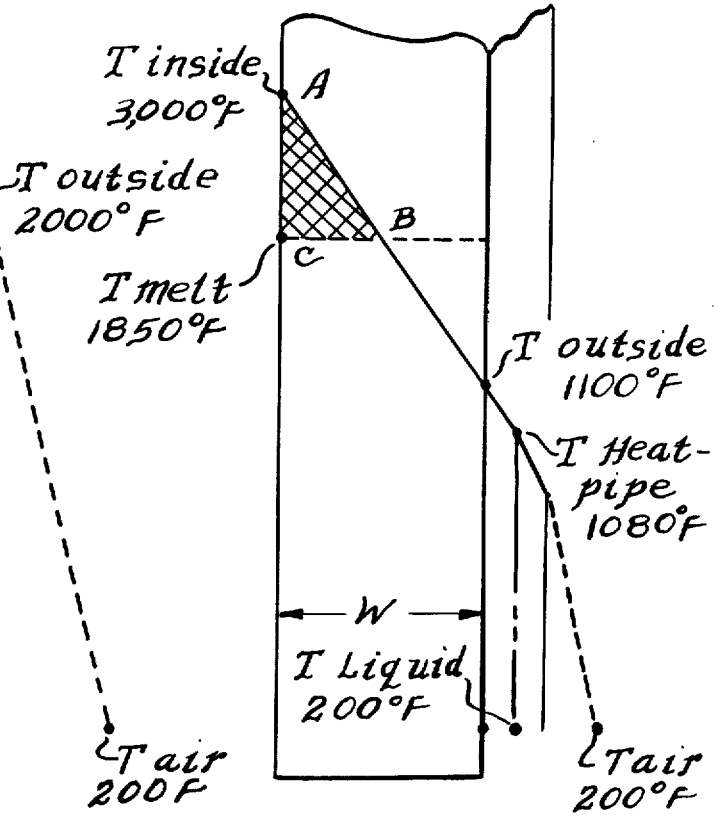
Fig-5a    Fig-5b

EMERGENCY HEAT REMOVAL SYSTEM FOR A NUCLEAR REACTOR

BACKGROUND OF THE INVENTION

The invention described herein was made in the course of, or under, employment with the U.S. Atomic Energy Commission.

FIELD OF THE INVENTION

The invention relates to a nuclear reactor heat removal system and more particularly to a back up heat removal system to supplement an emergency-core-cooling-system (ECCS) during a loss-of-collant-accident (LOCA).

DESCRIPTION OF THE PRIOR ART

The cooling system for a power reactor should ensure to the utmost extent possible adequate heat removal from the reactor core following an accident or the occurrence of abnormal conditions in the reactor. Thus, an emergency-core-cooling-system or ECCS must be provided supplementing the primary heat-transport-system (hereinafter referred to as HTS) to remove decay heat once the reactor is shutdown. Generally, it is recognized that an ECCS and the HTS together ensure that there will probably be sufficient capacity to remove sufficient decay heat to protect a reactor from fuel element meltdowns. This capability must exist for a broad spectrum of possible accident conditions from equipment failures to loss of electrical power to a complete loss-of-coolant-accident or LOCA. The problem remains particularly troublesome in the continued operation of Pressurized Water Reactors (PWR), Boiling Water Reactors (BWR) and the future development of Liquid Metal Fast Breeder Reactors (LMFBR).

For example, a LOCA in a nuclear reactor occurs when primary coolant escapes from the reactor coolant system as a result of rupture of a vessel or pipe in that system. Designs of ECCS have comprised a safety injection system wherein emergency coolant from reactor plant storage facilities was pumped to the reactor core in the event of a LOCA. U.S. Pat. application No. 147,941(70) filed on May 5, 1971, by Harry G. Johnson and Roland N. Macken is typical of this approach. This system necessitated the availability of large supplies of stored water and pumping means to deliver the emergency coolant to the reactor core. In addition, emergency coolant impinging on the reactor vessel tends to produce more thermal shock than a higher temperature coolant. Also, liquid emergency cooling with water tends to lag because cooling of the core cannot be initiated until "blowdown" is complete. Cooling of core hot spots may also be hindered by steam blockage of reactor coolant channels and a stagnant vapor blanket on hot surfaces, both of which occur as the coolant pressure drops and the coolant is vaporized by the hot fuel elements. Additional problems arise because of fission products contamination of the coolant introduced in the core and the inherent danger of leakage if fuel meltdown occurs.

Another ECCS is the flooding of the core by steam supplied from the secondary side of the steam turbines of a nuclear power plant. Although thermal shock problems are alleviated, it is readily apparent the steam flooding system has a limited duration in emergency cooling of water cooled reactors.

It has also been recognized that a fuel element meltdown was a possibility to be recognized in reactor design and particularly in fast reactors. U.S. Pat. application Ser. No. 133,654(70) filed on June 16, 1971 by George Jensen Jr. now U.S. Pat. No. 3,731,283 recognizes this need and provides a method for reducing the downward movement of fuel and fission products following a core meltdown in a fast reactor.

In regard to LMFBR's, it has been predicted a gross core meltdown would have temperatures exceeding 3000°C which is far above the temperature metallic containment means can withstand. It has also been estimated temperatures for thermal PWR would exceed 2500°F. In response to this problem of removing decay heat, molten core stopping devices have been designed such as shown in U.S. Pat. No. 3,607,630 issued to A. F. John M. West et al. on Sept. 21, 1971.

Thus, it became apparent an emergency-heat-removal system may be needed in addition to an ECCS to remove decay heat and yet have a sufficient margin of safety to prevent fuel element melting and pressure vessel damage as well as overcome the dangerous possibility of having a gross core meltdown. This need has also been highlighted by environmental considerations in achieving a safe and functional nuclear reactor.

Not only must this backup protection exist, it must be provided by as simple and reliable system as possible in order that its own effectiveness by undiminished by functional unreliability. Furthermore, it would be compatible with future reactor designs and potentially adaptable to existing PWR and BWR facilities.

SUMMARY OF THE INVENTION

Therefore, it is a primary object of this invention to provide an emergency heat removal system (EHRS) during LOCA for use on nuclear reactors.

It is also an object of this invention to provide a means of preventing pressure vessel hotspots during a LOCA in a nuclear reactor.

Another object of this invention is to prevent a gross core meltdown during a LOCA in a nuclear reactor.

Another object of this invention is to prevent fuel and fission product contamination released during a LOCA in a nuclear reactor.

Another object of this invention is to provide a simple, functional operable, emergency heat removal system (EHRS) during a LOCA in a nuclear reactor.

Another object of this invention is to provide an EHRS which inherently functions without external activation when the core reaches a predetermined temperature during a LOCA.

Another object of this invention is to provide an EHRS to distribute heat which is potentially adaptable to existing PWR's and BWR's.

Another object of the present invention is to provide an EHRS which relieves hotspot temperature peaking.

Another object of this invention is to control the rate of the heat removal from the pressure vessel in order to reduce thermal shock.

Another object of this invention is to provide a backup pressure vessel cooling system to protect vessel integrity during a gross core meltdown.

The inventive EHRS during a LOCA comprises a plurality of heat pipes having one end in heat transfer relationship with either the reactor pressure vessel, core support grid structure, or other in-core components and the opposite end in heat transfer relationship with a heat exchanger external to the pressure vessel wherein excessive heat generated in the reactor is transferred from the reactor via the heat pipes to the heat exchanger. The term heat exchanger includes a pit below the reactor which can be water filled during a LOCA, a trench capable of being water filled external to the reactor container building to reduce pressure within the building, or other conventional apparatus commonly used to dissipate heat.

One embodiment of the heat pipes uses an inherently self regulating heat pipe which uses a working fluid which increases in heat removal capacity as temperature increases. A second embodiment is to select the working fluid of the heat pipes to become operable above normal reactor operating temperatures with the heat exchanger end of the heat pipes exposed to a poor heat transfer medium such as stagnant air. At a predetermined temperature above normal operating temperatures, heat exchanger fluid is introduced around the end of the heat pipes in heat transfer relationship with the heat exchanger so as to provide a substantial heat sink. Either embodiment in combination with gradual controlled flooding around the heat pipes within the heat exchanger provide a wide range of heat removal.

For particular nomenclature associated with heat pipes and capabilities thereof, reference is made to *Scientific American*, "The Heat Pipe" by C. Yale Eastman, May 1968; U.S. Pat. No. 3,618,660 issued to Claus Busse on June, 1944, and U.S. Pat. No. 3,229,759 issued to G. M. Grover on Jan. 18, 1966.

The use of heat pipes to remove heat from a reactor vessel during normal operation has been illustrated in U.S. Pat. No. 3,378,449 issued to J. J. Roberts et al. on Apr. 16, 1968; U.S. Pat. No. 3,403,075 issued to P. Fiebelmann on Sept. 24, 1968; U.S. Pat. No. 3,509,386 issued to A. W. Byrd on Apr. 28, 1970; and U.S. Pat. No. 3,688,070 issued to P. Fiebelmann on June 6, 1972. The design of the EHRS contemplates that sufficient heat removal capacity is available to adequately cool the pressure vessel in the event a localized fuel meltdown within the core and to prevent any breech of the pressure vessel.

BRIEF DESCRIPTION OF THE DRAWINGS

FIG. 4a and 4b are representative schematic diagrams of the temperature profile through a reactor pressure vessel for a reactor with and without out-core heat pipes respectively during normal operation.

FIG. 5a and 5b are representative schematic diagrams of the temperature profile through a reactor pressure vessel for a reactor with and without out-core heat pipes respectively during a severe LOCA.

DESCRIPTION OF THE PREFERRED EMBODIMENT

Figure 1:
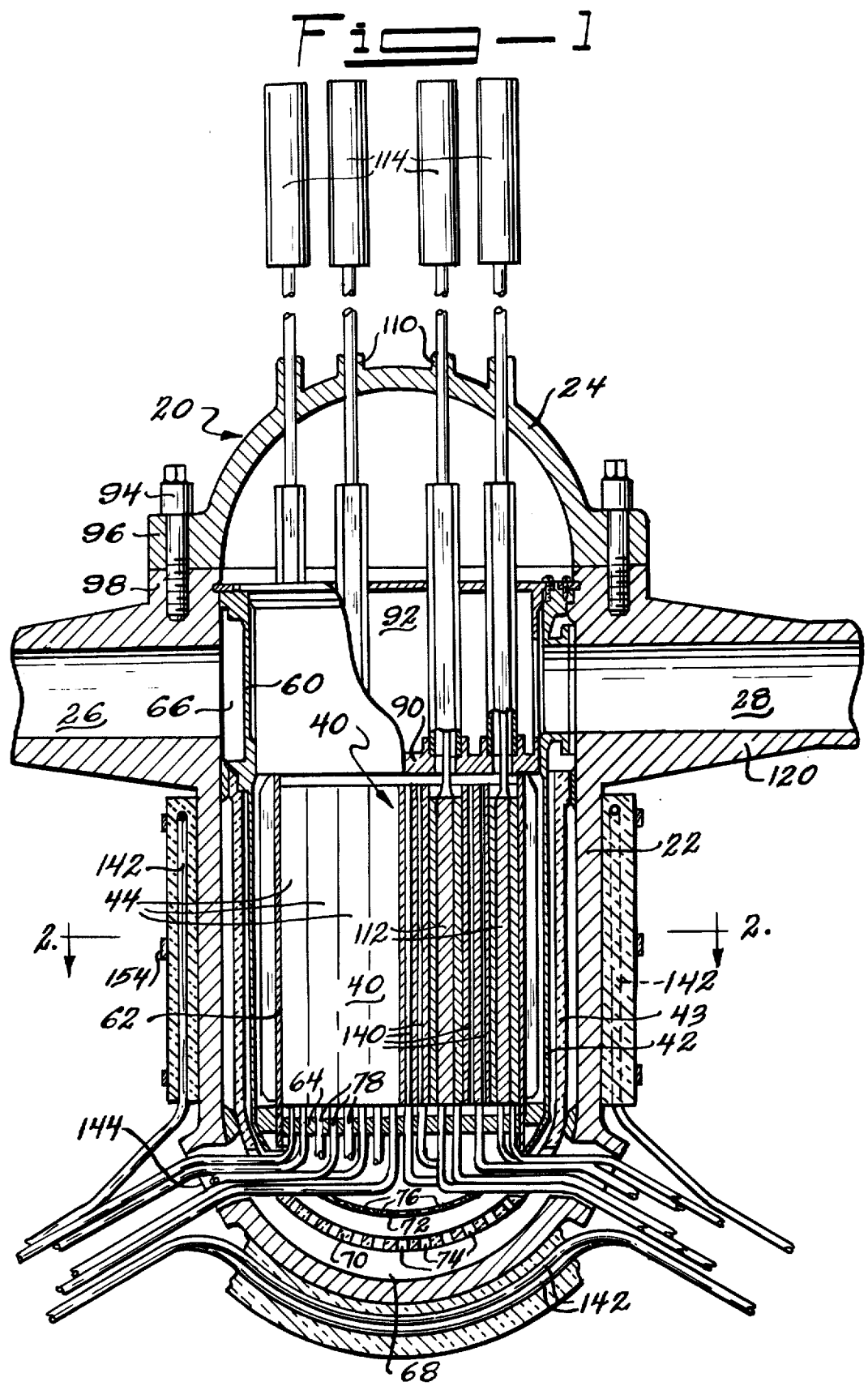
FIG. 1 is a vertical cross-sectional view of a nuclear reactor incorporating the features of the present invention.
Figure 2:
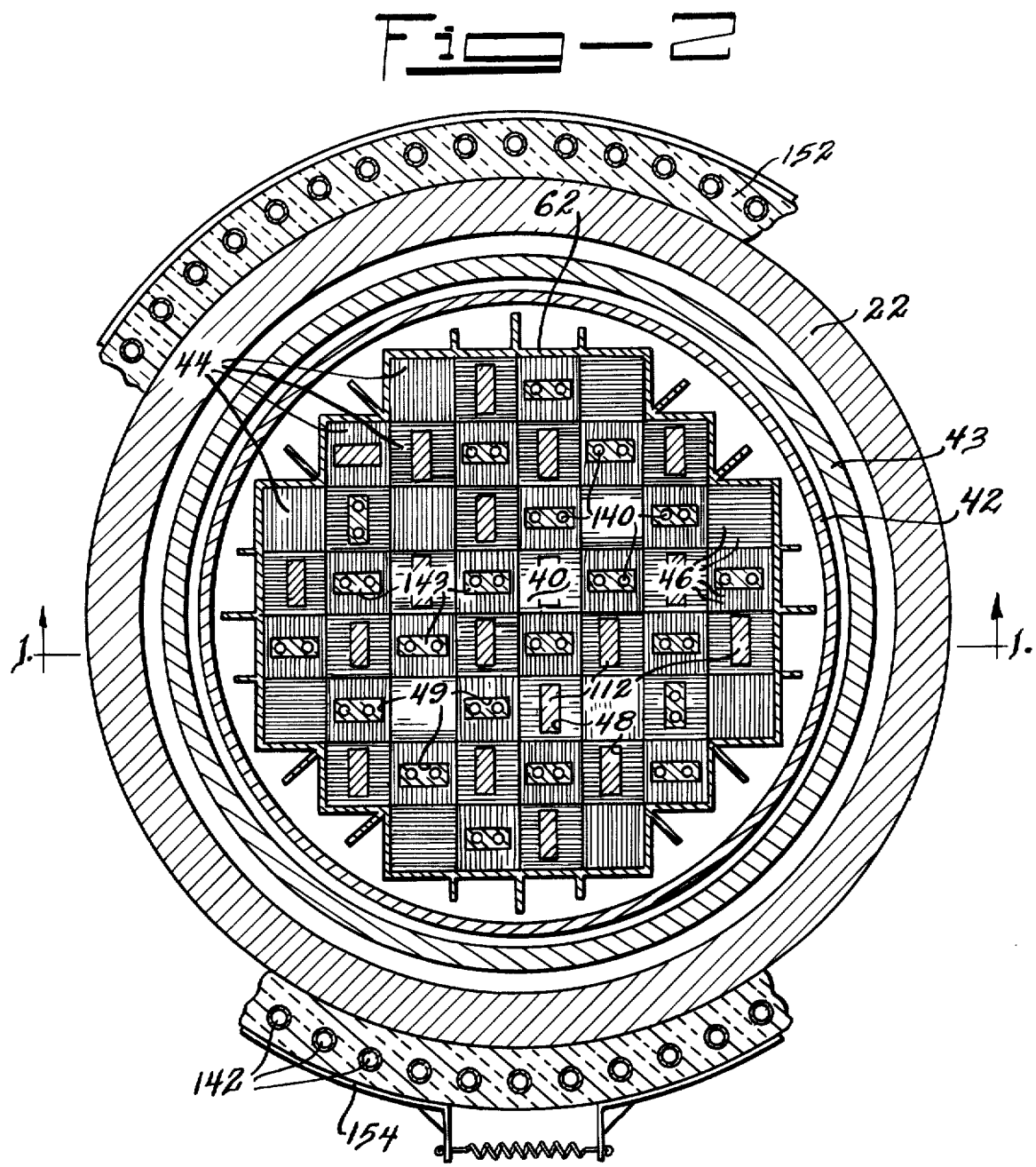
FIG. 2 is a horizontal cross-sectional view of the reactor along line 2—2 of FIG. 1.
Figure 3:
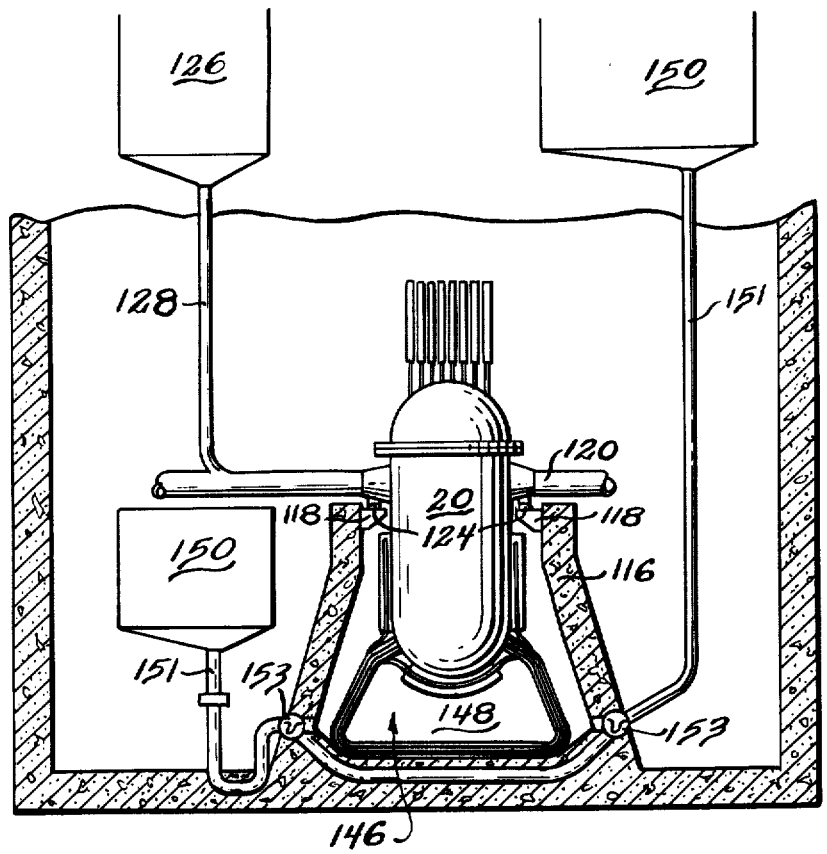
FIG. 3 is a schematic diagram illustrating a nuclear reactor incorporating features of the present invention having the controlled flooding heat reservoir.

The invention can best be understood by reference to the drawings where a PWR is shown, although it is apparent a BWR or LMFBR could also have been illustrated to show features of the invention. Referring to FIG. 1-3, a PWR having a pressure vessel 20, comprising a vessel shell 22, a closure head 24, inlet and outlet coolant passages 26 and 28, and core 40 supported with a core support structure 42. The core support structure 42 comprises an upper baffle assembly 60, an inner support barrel 62, and allower baffle assembly 64. Thermal shield 43 is placed between the core 40 and support structure 42.

The core 40 having fissionable fuel comprises a plurality of fuel elements 44 having vertical coolant and control rod channels 46 and 48 respectively extending therethrough. The coolant enters an inlet 26, as indicated by the directional arrows in FIG. 1, passes by an upper baffle assembly 60 into plenum 66 and along the inner support barrel 62 into a common plenum 68, passes through baffle plates 70 and 72 of thermal shield 43 and barrel 62 respectively having openings 74 and 76 respectively, enters the coolant passage 78 at the bottom of fuel elements 44 along assembly 64 and passes therethrough by passages 90 of assembly 62, enters a common plenum 92 within assembly 60 and exits at outlet 28. The vessel head 24 is attached to the vessel shell 22 by large bolts 94 extending through flange 96 in the head 24 and flange 98 in the vessel shell 22. The closure head 24 has a plurality of openings 110 therethrough for the control rods 112 which are attached to control rod drive mechanisms 114. The pressure vessel 20 is supported within a frustra-conical concrete structure 116 having extending steel ledges 118 wherein the vessel 20 is supported by structure ledges 118.

Incumbent with this PWR is a water flooding Emergency Core Coolant System (ECCS) comprising a tank of water 126 connected to inlet passage 26 via piping 128 as shown in FIG. 3. Similarly, other ECCS systems as described in the aforementioned prior art could readily be used as well as the described water flooding system.

It should be emphasized the present invention is a supplemental system to the emergency core cooling system of a nuclear reactor. This assumes the reactor can be shutdown by scramming the rods or poisoning the core during an emergency situation such as a blocked coolant flow passage, or positive reactivity transit which initiates a scram situation wherein the specific problem the invention is directed to with is decay heat removal.

The inventive backup EHRS comprises in-core or out-core heat pipes 140 or 142 respectively, singularly or in the combination, as illustrated in FIG. 1, in heat transfer relationship with the fuel elements 44 or vessel shell 22. The in-core heat pipes 140 extend through reentrant openings 144 through the vessel shell to a heat exchanger 146. Similarly, out-core heat pipes extend along side of vessel shell 22 to heat exchanger 146.

The heat exchanger 146, as shown in FIG. 3, comprises a fluid reservoir 148 formed at the base of structure 116 beneath the pressure vessel and a source of fluid. The source of fluid comprises tanks 148, which may be at different levels, which are connected to reservoir 148 via piping 151 and valve 153. The in-core heat pipes 140 are located within control rod coolant channel 48 whereas the out-core heat pipes 142 are located around the pressure shell 22 by suitable mounting means. The reservoir end of the heat pipes 140 and 142 are disposed along the reservoir floor in a manner to maximize heat transfer area. In the first embodiment, the operability of the heat pipes becomes inherently self-regulating in that no external mechanism need to be activated in initiate decay heat removal. For example, both in-core and out-core heat pipes 140 and 142 can be designed to have the heat removal capability increasing as the temperature increases. U.S. Pat. application Ser. No. 287,211(70) filed by Gregoire et al. on Sept. 7, 1972 now U.S. Pat. No. 3,854,524 describes such a heat pipe system for use in nuclear reactors. The heat pipe can be constructed of the same materials as the reactor core and compatible with the coolant. Specific materials for the tubing will include aluminum, stainless steel, zirconium, metal alloys and reactor hardware metals. Materials selected will have a low neutron cross section so as to not unduly preturb the neutron flux in the core. Working fluids within the heat pipe includes $H_2O$, $D_2O$, liquid metals selected from the group consisting of sodium, lithium, mercury, and diphenyl organics. $H_2O$ is the preferred working fluid in water cooled reactors and lithium is the preferred working fluid in liquid metal cooled reactors.

The various chemical properties of representative working fluids are illustrated in TABLE I.

reactor. The general guidelines for coolant selection besides the parameters suggested in the basic Grover heat pipe patent include stability under radiation, low pressure in a high temperature environment and adequate heat of vaporization.

The fluid reservoir 146 used as a heatsink for the heat pipes 140, would have a fluid selected to compatible with the working fluid within the heat pipes so as to reduce safety problems as well as have a high heat of vaporization. The reservoir fluid would be selected from water, organics, ammonia, or other fluids meeting the above criteria. The reservoir may be empty or have a small amount of fluid during normal reactor operation whereas, the valves would be actuated within fractions of a second during temperature, excursions experienced during a LOCA. As illustrated in FIG. 3, the vaporized fluid could be directed pass the outside surface of the pressure vessel to provide more uniform cooling. If other conventional heat exchanger apparatus as a closed circuit system is used, instead of a reservoir, then water would be used in the secondary shell.

TABLE I

| HEAT PIPE WORKING FLUIDS | | | | | | |
|---|---|---|---|---|---|---|
| Working Fluids | $H_2O$ | $D_2O$ | Hg | Na | Li | Diphenyl $(C_6H_5)_2$ |
| Molecular Weight | 18 | 20 | 200.6 | 23 | 7 | 154.2 |
| Boiling Point of (°F) | 212 | | 675 | 1621 | 2403 | 490 |
| Melting Point of (°F) | 32 | | −40 | 208 | 367 | 158 |
| Maximum Operating Temperature (°F) | 600 | | 1200 | 1500 | — | 700 |
| Operating Pressure, psig | 2000 | | 100–200 | 0–100 | 0–100 | 250 |
| Heat Transfer Coef (20 fps) BTU/(hr) $(ft^2)$ (°F) | 8000 | | — | 25,000 | 25,000 | 2000 |
| Specific Heat BTU/$(ft^3)$ (°F) | 60 | | 25.7 | 18.7 | 38 | 25 |
| Latent Heat of Fusion BTU/lb | — | | 5 | 49 | 284 | 177.8 |
| Latent Heat of Vaporization BTU/lb | 728 to 998 | | 125 | 1810 | 8420 | 136.5 |
| Thermal Absorption Cross Section a at 600° F | 0.11 | 85 × 10⁻⁴ | 9.6 | 0.0064 | 0.001 | 0.009 |
| Slowing Down Power ξ | 1.5 | 0.18 | 0.003 | 0.005 | 0.01 | 1.0 |
| Corrosion-Resistant Structural Material | 300 Series, Zr, Hf Ti, Stellites | | Fe, 300 Series | 300 series, Ni alloys, W, Mo, low-c steel | Same as Na | Many |

For comparative purposes, to show the variance in heat removal capability between the heat pipe working fluids and air, TABLE II presents data on air at various temperatures.

TABLE II

| PHYSICAL PROPERTIES OF AIR | | |
|---|---|---|
| Temperature °R | Thermal Conductivity BTU/ (ft) (hr) (°F) | Specific Heat BTU/ (lb) (°F) |
| 180 | 0.00535 | 0.246 |
| 360 | 0.01044 | 0.241 |
| 540 | 0.01518 | 0.240 |
| 720 | 0.01943 | 0.242 |
| 900 | 0.02340 | 0.246 |
| 1080 | 0.02700 | 0.251 |
| 1260 | 0.03030 | 0.257 |

In general, working fluids will be selected to be compatible with coolants and fuel cladding used in the reactors. For example, lithium would not be utilized in a PWR or BWR due to the inherent chemical incompatibility of water and lithium which would create safety problems. Similarly water would not be selected for use in a sodium cooled liquid metal fast breeder reactor. The heat pipes would then become the primary reentrant tubes.

Besides the safety feature of inherent activation of the working fluid, the subject invention can also remove heat from the core without exposing additional fluid to possible radioactive contamination.

The suitable mounting means of the out-core heat pipes 142, as shown in FIG. 1 and 2, comprises fitting the pipes 142 within thermal conducting blocks 152 which are attached to the outside of the reactor pressure vessel. To preserve the integrity of the pressure vessel 20 during a LOCA or gross core meltdown large numbers of heat pipes are positioned at the lower portion of the pressure vessel. The blocks 152 have heat pipes 142 located therein which extend to the heat exchanger fluid reservoir 146. This embodiment would be particularly adaptable for use in existing commercial power plants where large areas and spacing around the existing pressure vessel shell could be utilized.

The blocks 152 could be constructed from metals compatible to the pressure vessel such as steel plate, molybdenum, aluminum, copper, beryllium or alloys thereof in combination. It is desired that the blocks 152 have a slightly less coefficient of thermal expansion so that during heat buildup good thermal contact is maintained at the block-vessel interface. Spring loaded steel bands or cables 154 as shown in FIG. 1 attach the blocks to the vessel. Lugs (not shown) on the external surface of the pressure vessel shell 22 may be readily added to existing PWR's and BWR's and are used to tighten the blocks so as to maintain thermal contact with the pressure vessel. The blocks are designed to have sufficient area adjacent the vessel to remove decay heat from the vessel and not limit the removal capacity of the heat pipes located therein.

The function of the out-core heat pipes 142 can best be illustrated by referring to parameters associated with PWR's and BWR's. Referring to FIG. 4a and 4b, the out-core heat pipes provide a significantly greater heat sink on the outside of the pressure vessel of thickness W than the stagnant air which surrounds the outer surface of the vessel. When the temperature of the inside of the pressure vessel is about 600°F, the outside of the pressure vessel would be between 150°–250°F during normal reactor operation.

Assuming a double end rupture of a primary cooling pipe, the reactor would be scramed with control rods going into the reactor core within fractions of a second to reduce the power level. A large portion of the water in the reactor core vessel would immediately flash to steam with the reduction in pressure. In seconds much of the water would be forced out of the primary coolant rupture and the core would start to increase in temperature. The ECCS would immediately be placed in operation with the core coolant spray in an attempt to reduce the steam formation in the core and begin to cool the core.

Assuming a severe LOCA where the core is rapidly depressurized within a few micro-seconds, the vaporization of the reactor coolant will completely void the core causing a core meltdown. Thus a molten mass of core material assumed to be a temperature of 3000°F would be located at the lower portion of the core. As shown in FIG. 5a and 5b, the addition of heat pipes on the outer portion of the core can significantly reduce the scarring and penetration of molten mass into the pressure vessel. The flooding of the reservoir and resulting vaporization of the reservoir flood greatly increases the heat removal capability of the outside of the pressure vessel. Accordingly, only a portion of the pressure vessel wall may be scarred or melted as representatively shown by area A–B–C in FIG. 5b. In this manner the integrity of the pressure vessel is maintained so that radioactive debris and fission products are contained within the vessel.

In a similar situation a LOCA may result in slow depressurization and partial voiding of the core. As the rods have been driven in to reduce the degree of heat generated, the heat pipes located on the side of the vessel can remove decay heat at a rate sufficient to maintain liquid coolant around the lower portion of the core. This prevents some of the water in the pressure vessel from flashing to steam. If one-third of the water in the pressure vessel remains, the core will not melt and will be protected from complete destruction and resulting release of fission fragments. If more water is lost the core will begin melting and the molten parts of the fuel elements will drop to the pressure vessel surface and resolidify. Thus, the outcore heat pipe system assists in maintaining the integrity of the pressure vessel and so to provide a means to contain most of the fission products.

Recognizing that precise physical properties for heat pipe working fluids may not be available for all reactor operating temperatures or practical due to compatibility problems, the inventive devices are readily adaptable to more conventional ECCS fluid flooding approaches by altering the rate of fluid flow within the heat exchange reservoir. In this manner heat pipe working fluids are selected to function during normal reactor operation temperatures, however with little or no fluid within the heat exchange reservoir. Without a heat sink, very little heat is lost from the reactor core. The tanks 150 above the pressure vessel contains sufficient fluid to gradually flood the heat exchange reservoir. Instrumentation means (not shown) within the reactor detect temperature excursion due to an emergency condition and accordingly activate and control the fluid flow within the reservoir. As previously mentioned, upon sensing of excess heat generation due to a LOCA or failure of the ECCS, pumps or valves are activated to gradually flood by gravity, the heat exchanger reservoir. In this manner, the heat removal capability of both in-core and out-core systems can readily be controlled by selecting the reservoir fluid having a high heat of vaporization and controlling the rate of flooding.

Assuming a normal operating temperature of 500°F for a PWR or BWR, a heat pipe coolant would be selected at a satisfactory pressure which would vaporize at 600°F such that the heat pipe would become active when the core temperature exceeded the normal temperature. Similarly a liquid metal heat pipe coolant could be selected for a liquid metal cooled reactor as noted in the Gregoire et al. application.

The number of heat pipes would be selected to remove the estimated amount of decay heat which is generally from about 5 to 12 percent of the operating power. Assuming a maximum decay heat buildup of 5 percent of 1000mw nuclear reactor plant, 50Mw of heat would have to be removed from the core to prevent localized melting. As noted in the basic heat pipe patents, a heat pipe of five-eights of an inch diameter could remove 1.0Mw/hr. Thus a total of 50 heat pipes would remove the total amount of decay heat generated after shutdown. Typically in-core heat pipes range in size from 1/16 inch to ¼ inch and out-core heat pipes range from ½ inch to 1 inch. The critical flux density is on the order of 320,000 BTU per hour per square foot of evaporator surface for water at 212°F and 1,600,000 BTU per hr per square foot for lithium at 2,700°F. Based on these parameters, it is readily apparent that various numbers and numerous heat pipe sizes could provide adequate decay heat removal.

It also should be apparent that in-core and out-core heat pipe systems could be used in various combinations either with inherent self activation or continuous operation in conjunction with the fluid control of the reservoir. For example, the inventive back up EHRS in FIG. 1 can comprise the combination of inherent self activation in-core heat pipes 140 and continuous operation out-core heat pipes 142 in conjunction with the fluid control of the reservoir.

Thus has been described an inventive emergency heat removal system which accomplishes the aforementioned objects. The scope of invention coverage desired by letters and patents is set forth by the appended claims.

I claim:

1. An apparatus for removing decay heat from a nuclear reactor having a core, pressure vessel, and cooling system comprising: a heat exchange reservoir; a plurality of heat pipes having a working fluid selected from the group consisting of water, sodium, lithium, bismuth and mercury, the first end of a heat pipe in heat transfer relationship with the nuclear reactor and the second end within the reservoir; a fluid storage tank with fluid therein; a fluid connecting means between the reservoir and tank having a valve; a means to detect core temperatures; and a means to activate the connecting means valve upon detecting core temperatures to control the fluid flow between the storage tank and heat exchange reservoir.

2. The apparatus as defined in claim 1 wherein the first heat pipe end is in heat transfer relationship with the fuel elements of the reactor core.

3. The apparatus as defined in claim 1 wherein the first heat pipe end is in heat transfer relationship with the pressure vessel of the reactor, said first end of said heat pipes embedded in thermal conducting blocks affixed adjacent to the pressure vessel.

4. The apparatus as defined in claim 1 wherein a first group of said heat pipes have the first heat pipe end in heat transfer relationship with the fuel elements of the reactor core, and a second group of said heat pipes have the first heat pipe end in heat transfer relationship with the pressure vessel of the reactor.

5. The apparatus as defined in claim 1 wherein the heat exchanger reservoir fluid is selected from the group consisting of light water, heavy water, sodium, lithium, diphenyl, and mercury.

* * * * *